US006859268B2

(12) United States Patent
Chou et al.

(10) Patent No.: US 6,859,268 B2
(45) Date of Patent: *Feb. 22, 2005

(54) COMPENSATING POLARIZATION MODE DISPERSION IN FIBER OPTIC TRANSMISSION SYSTEMS

(75) Inventors: Patrick C. Chou, Fremont, CA (US); John M. Fini, Cambridge, MA (US); Hermann A. Haus, Lexington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 381 days.

This patent is subject to a terminal disclaimer.

(21) Appl. No.: 09/785,039

(22) Filed: Feb. 15, 2001

(65) Prior Publication Data

US 2003/0086144 A1 May 8, 2003

Related U.S. Application Data

(63) Continuation-in-part of application No. 09/505,313, filed on Feb. 16, 2000, now Pat. No. 6,567,167
(60) Provisional application No. 60/243,522, filed on Oct. 23, 2000.

(51) Int. Cl.[7] .............................................. G01N 21/00
(52) U.S. Cl. ..................................................... 356/73.1
(58) Field of Search ........................ 356/73.1, 364–368; 359/246, 249, 192, 156, 153, 189, 484–499; 385/11, 28, 29, 123

(56) References Cited

U.S. PATENT DOCUMENTS 5,659,412 A  8/1997 Hakki ........................ 359/156

FOREIGN PATENT DOCUMENTS

EP       0 909 045      4/1998

OTHER PUBLICATIONS

Bulow et al., "Measurement of the Maximum Speed of PMD Fluctuation in Installed Field Fiber," Optical Fiber Communication Conference and the International Conference on Integrated Optics and Optical Fiber Communications (Cat. No. 99CH36322), *IEEE*, Part vol. 2, 1999, pp. 83–85, vol. 2, Piscataway, NJ, USA.

Chbat et al., "Long Term Field Demonstration of Optical PMD Compensation on an Installed OC–192 Link," Optical Fiber Communication Conference and the International Conference on Integrated Optics and Optical Fiber Communications (Cat. No. 99CH36322), *IEEE*, Part Suppl., 1999, pp. PD/12–1–3 Suppl., Piscataway, NJ, USA.

Glingener et al., "Polarization mode dispersion compensation at 20 Gb/s with a compact distributed equalizer in $LiNbO_3$," Optical Fiber Communication Conference and the International Conference on Integrated Optics and Optical Fiber Communications (Cat. No. 99CH36322), *IEEE*, Part Suppl., 1999, pp. PD29/1–3 Suppl., Piscataway, NJ, USA.

Heffner, "Deterministic, Analytically Complete Measurement of Polarization–Dependent Transmission Through Optical Devices," *IEEE Photonics Technology Letters*, 4:451–454, 1992.

(List continued on next page.)

*Primary Examiner*—Tu T. Nguyen
(74) *Attorney, Agent, or Firm*—Fish & Richardson P.C.

(57) ABSTRACT

A real-time optical compensating apparatus reduces the PMD in an optical fiber by determining the principal states of polarization of the optical fiber and delaying one principal state of polarization with respect to the other.

30 Claims, 13 Drawing Sheets

OTHER PUBLICATIONS

Heismann et al., "Electrooptic Polarization Scramblers for Optically Amplified Long–Haul Transmission Systems," *IEEE Photonics Technology Letters*, 1994.

Heismann et al., "Automatic Compensation of First–Order Polarization Mode Dispersion in a 10Gb/s Transmission System," *ECOC*, 529–530, 1998.

Poole et al., "Polarization–dependent pulse compression and broadening due to polarization dispersion in dispersion–shifted fiber," *Optics Letters*, 13:155–157, 1998.

Poole et al., "Phenomenological Approach to Polarisation Dispersion in Long Single–Mode Fibres," *Electronics Letters*, 22:1029–1030, 1986.

Francia C. et al., "Polarization Mode Dispersion in Single–Mode Optical Fibers: Time Impulse Response", 1999 IEEE International Conference on Communications, Conference Record, Vancouver, CA, Jun. 6–10, 1999, IEEE International Conference on Communications, New York, NY, vol. 3, Jun. 6, 1999, pp. 1731–1735.

Hok Yong Pua et al., "An Adaptive First–Order Polarization–Mode Dispersion Compensation System Aided by Polarization Scrambling: Theory and Demonstration", Journal of Lightwave Technology, IEEE, vol. 18, No. 6, Jun. 2000, pp. 832–841.

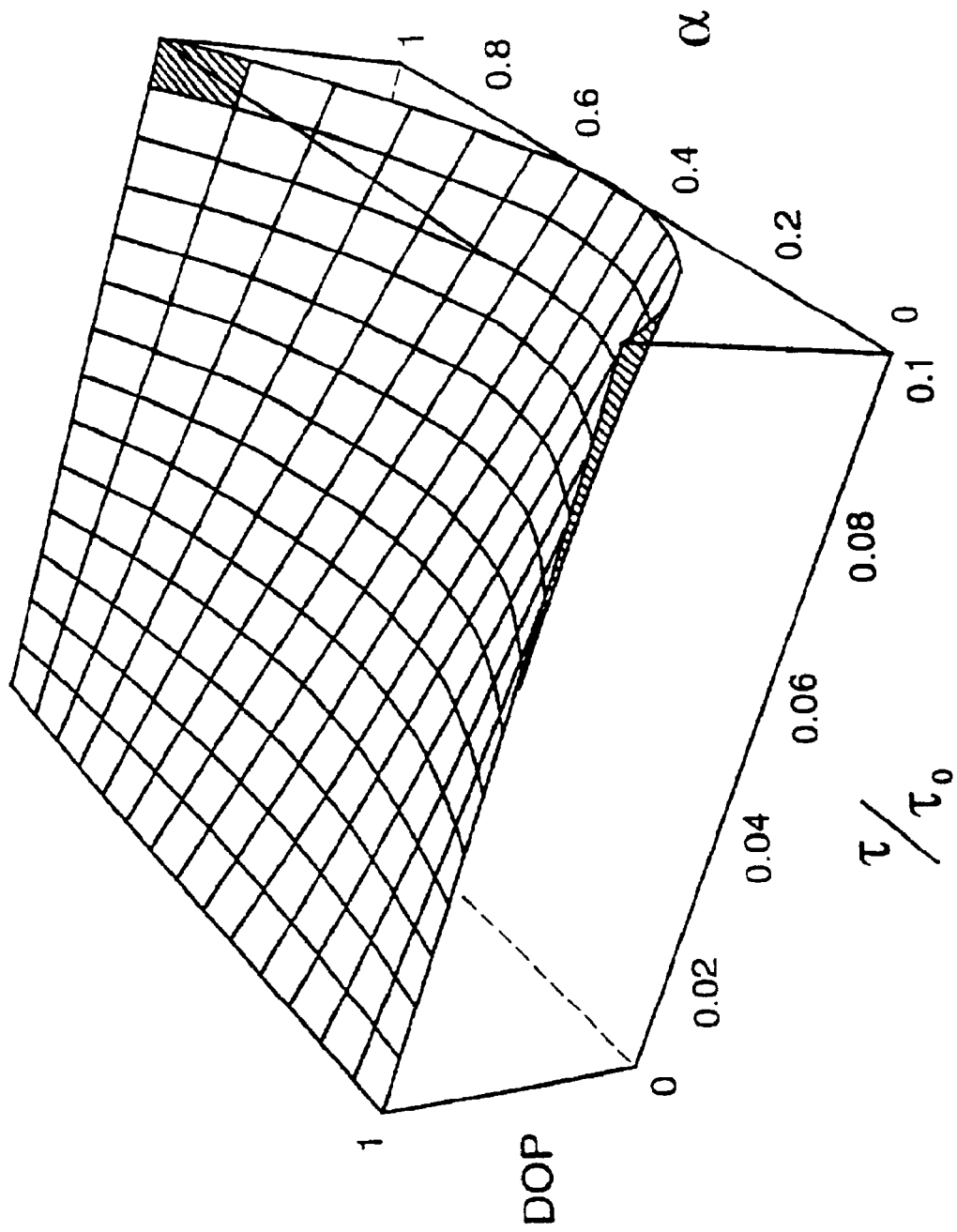

COMPENSATING POLARIZATION MODE DISPERSION IN FIBER OPTIC TRANSMISSION SYSTEMS

RELATED APPLICATIONS

This application is a continuation-in-part of U.S. Patent Application Ser. No. 09/505,313, filed Feb. 16, 2000, now U.S. Pat. No. 6,567,167, and under 35 USC §119(e)(1), claims the benefit of U.S. Provisional Application Ser. No. 60/243,522, filed Oct. 23, 2000, which is incorporated herein by reference.

BACKGROUND OF THE INVENTION

This invention relates generally to fiber optics and more specifically to an apparatus for reducing the polarization mode dispersion in a fiber optic transmission system. Polarization mode dispersion (PMD) refers to variations in the time delay of a polarized optical signal traveling through an optical transmission system, such as a single-mode optical fiber. PMD arises in an optical fiber as a result of asymmetries in the optical fiber's core, such as core ellipticity created during optical manufacturing and bending stresses formed during installation. The asymmetries of the fiber's core cause random changes in the state of polarization (SOP) of optical signals propagating through the fiber. Different SOPs propagate through the optical fiber core at different relative speeds, e.g., some SOPs travel faster and some travel slower, resulting in a pulse width distortion of a transmitted optical signal relative to an input optical signal. Additionally, the asymmetries of the fiber's core are highly susceptible to environmental fluctuations, such as temperature or movement of the fiber, which occur as fast as milliseconds and result in a time varying pulse width distortion of the transmitted optical signal.

The varying pulse width distortion is mathematically represented by a time delay between two orthogonally polarized principal states of polarization ("PSP") which form a convenient basis set to describe and characterize each SOP, and evaluate the effects of PMD in the fiber. Using the PSPs as a basis set, each SOP propagating through an optical fiber is represented by a linear combination of the two orthogonally polarized PSPs. The varying pulse width distortion of the SOP is a function of a varying delay between the PSPs. Theoretically, each PSP experiences a time of flight difference through the optical fiber, commonly known as differential group delay, resulting in a time delay between the two PSPs at the fiber output. The output SOP is represented by a linear combination of the PSPs which are time delayed with respect to each other. A greater time delay between the PSPs corresponds to a larger relative difference between the input SOP pulse width and the output SOP pulse width. See for example C. D. Poole and R. E. Wagner, "A Phenomenological Approach to Polarization Dispersion in Long Single-Mode Fibers." Electronic Letters, Vol. 22, pp. 1029–1030, September 1986, which is incorporated by reference herein.

Optical fibers have a differential group delay (DGD) between the two PSPs on the order of 0.1 ps/km. In older fiber optic cables, such as the cables used in terrestrial networks, the DGD is on the order of 2.0 ps/km and results in time delays of about 50 picoseconds for transmission distances of only several hundred kilometers. As the demand for faster optical data transmission increases, such as from gigabits per second to terabits per second, optical pulse width distortion due to PMD will become one of the factors limiting data transmission rate.

SUMMARY OF THE INVENTION

A real-time optical compensating apparatus reduces first-order PMD in an optical fiber by determining the PSPs of the optical fiber and delaying one PSP with respect to the other.

In one aspect, the invention features an optical compensating apparatus including a polarization controller configured to receive an optical signal propagating through an optical medium, determine the principal states of polarization of the optical medium, and transform the optical properties of the optical signal based on the principal states of polarization.

Embodiments of this aspect may include one or more of the following. The polarization controller includes a polarimeter configured to receive and to measure the state of polarization of the optical signal, and a polarization transformer arranged in the path of the optical signal after the polarimeter and configured to transform the polarization of the optical signal. The polarization controller includes a central processing unit programmed to monitor the time averaged state of polarization of the optical signal and determine the principle states of polarization of the optical medium based on the time averaged state of polarization. The central processing unit analyzes time averaged states of polarization via the relationship, $$DOP = |\vec{r}_k| = \frac{1-|\vec{a}|^2}{|\vec{r}_k - (\vec{a}\cdot\hat{\tau}_k)\vec{a}|},$$

to determine the principle states of polarization by calculating the vector $\vec{a}$. The central processing unit is programmed to determine a magnitude of time delay between the principle states of polarization based on the time averaged state of polarization. The central processing unit is programmed to determine the relative order, in time, of the principle states of polarization. The compensating apparatus includes a delay controller arranged in an optical path of the optical signal after the polarization controller. The delay controller is configured to receive the transformed optical signal and to generate a signal proportional to the PMD time delay between the principle states of polarization. The delay controller includes a DOP sensor, such as a polarimeter or spectrum analyzer. The delay controller includes a delay transformer arranged in the path of the transformed optical signal before the polarimeter. The compensating apparatus further includes a PMD generating module arranged in the optical path of the medium before the polarization controller and configured to receive the optical signal from the optical medium and generate a known PMD. The compensating apparatus further includes a calibrating unit arranged in an optical path of the optical signal after the polarization controller. The calibrating unit is configured to receive the transformed optical signal and determine the transformation of the polarization controller. The calibrating unit includes at least one detector for detecting one or more components of the optical signal.

In another aspect, the invention features, an optical compensating apparatus for reducing PMD in an optical signal transmitted through an optical medium. The optical compensating apparatus includes a polarization controller configured to receive an optical signal propagating through the optical medium, determine the principal states of polarization of the optical medium and a magnitude of time delay between the principal states of polarization; and a delay controller arranged in an optical path of the medium after the polarization controller and configured to receive the transformed optical signal, wherein the polarization controller transforms the optical signal based on the principal states of polarization and the delay controller compensates PMD of the optical signal by reducing the time delay between the principle states of polarization based on the magnitude of time delay.

Embodiments of this aspect may include one or more of the following. The polarization controller includes a polarimeter. The polarization controller includes a polarization transformer arranged in the path of the optical signal after the polarimeter. The delay controller is configured to generate a signal proportional to the PMD time delay between the principle states of polarization. The delay controller includes a DOP sensor, such as a polarimeter or spectrum analyzer. The delay controller includes a delay transformer arranged in the path of the transformed optical signal before the polarimeter of the delay controller. The delay controller includes a delay transformer arranged in the path of the transformed optical signal after the polarimeter of the polarization controller and before a polarimeter of the delay controller.

In another aspect, the invention features an optical compensating apparatus for reducing PMD in an optical signal transmitted through an optical medium. The apparatus includes a polarization module configured to receive an optical signal propagating through the optical medium, determine the principal states of polarization of the optical medium, and generate a signal for transforming the polarization of the optical signal; and an optical transformer arranged in an optical path of the medium after the polarization module and configured to transform the optical signal and reduce a time delay between the principle states of polarization based on the signal received from the polarization module.

Embodiments of this aspect may include one or more of the following. The polarization module includes a polarimeter. The optical transformer includes a polarization transformer and a delay controller. The polarization transformer and a delay controller each include a polarimeter. The polarimeter of the delay controller is configured to generate a signal proportional to the PMD time delay. The delay controller includes a delay transformer arranged in the path of the transformed optical signal before the polarimeter of the delay controller and after the polarization transformer.

In another aspect, the invention features a method of reducing PMD of an optical signal propagating in an optical medium. The method includes determining the principal state of polarizations of the optical medium with a polarization controller, and transforming the polarization of the optical signal with a polarization transforming device based on the polarization of the first principal state of polarization.

Embodiments of this aspect may include one or more of the following. The method further includes determining the time delay between a first principal state of polarization and a second principal state of polarization. The method further includes delaying the first principal state of polarization with respect to a second principal state of polarization. The method further includes delaying a first principal state of polarization with respect to a second principal state of polarization. The method further includes determining the relative order, in time, of the principle states of polarization. The method further includes monitoring a time averaged state of polarization of an optical signal propagating through the optical medium. The step of determining the principle states of polarization includes analyzing the time averaged state of polarization. The time averaged states of polarization follow the relationship, $$DOP = |\vec{r}_k| = \frac{1 - |\vec{a}|^2}{|\vec{r}_k - (\vec{a} \cdot \hat{\tau}_k)\vec{a}|},$$

and determining the principle states of polarization includes calculating the vector $\vec{a}$. The vector $\vec{a}$ is determined by analyzing $\vec{r}_k$ with nonlinear curve fitting techniques or matrix methods. The method further includes calibrating a polarization controller for transforming the optical signal to determine a plurality of control settings for the polarization controller by monitoring which control signals when applied to the polarization control transform an input optical signal having a specific state of polarization into an output signal having different state of polarization.

In another aspect, the invention features a method of compensating PMD of an optical signal propagating through an optical medium. The method includes recording the time averaged state of polarization of an optical signal propagating through an optical medium; and analyzing the time averaged state of polarization of the optical signal via a pertubative expansion of the time averaged state of polarization, $\vec{r}$, to extract a plurality of parameters from the time averaged state of polarization that characterize the PMD of the optical signal, wherein the pertubative expansion is expressed as $DOP^2 \equiv |\vec{r}|^2 = |\vec{S}_{0,\parallel}|^2 + (1 - \Delta\omega^2_{pulse} \tau^2_{PMD}) |\vec{S}_{0,\perp}|^2 + \{\Delta\omega^3\}$. The plurality of parameters, for example, can be used to characterize the location of the principle states of polarization on the Poincaré sphere, the magnitude of time delay between the principle states of polarization, and the frequency dependence of the PMD.

The invention has various advantages including, but not limited to, one or more of the following. The apparatus for compensating PMD operates in real time and does not require a fast detector.

BRIEF DESCRIPTION OF THE DRAWINGS

FIG. 7B is a graphical representation of the degree of polarization as a function of the time delay, τ, between and the relative power, α, of each principal state of polarization;

DESCRIPTION OF THE EMBODIMENTS

Figure 1:
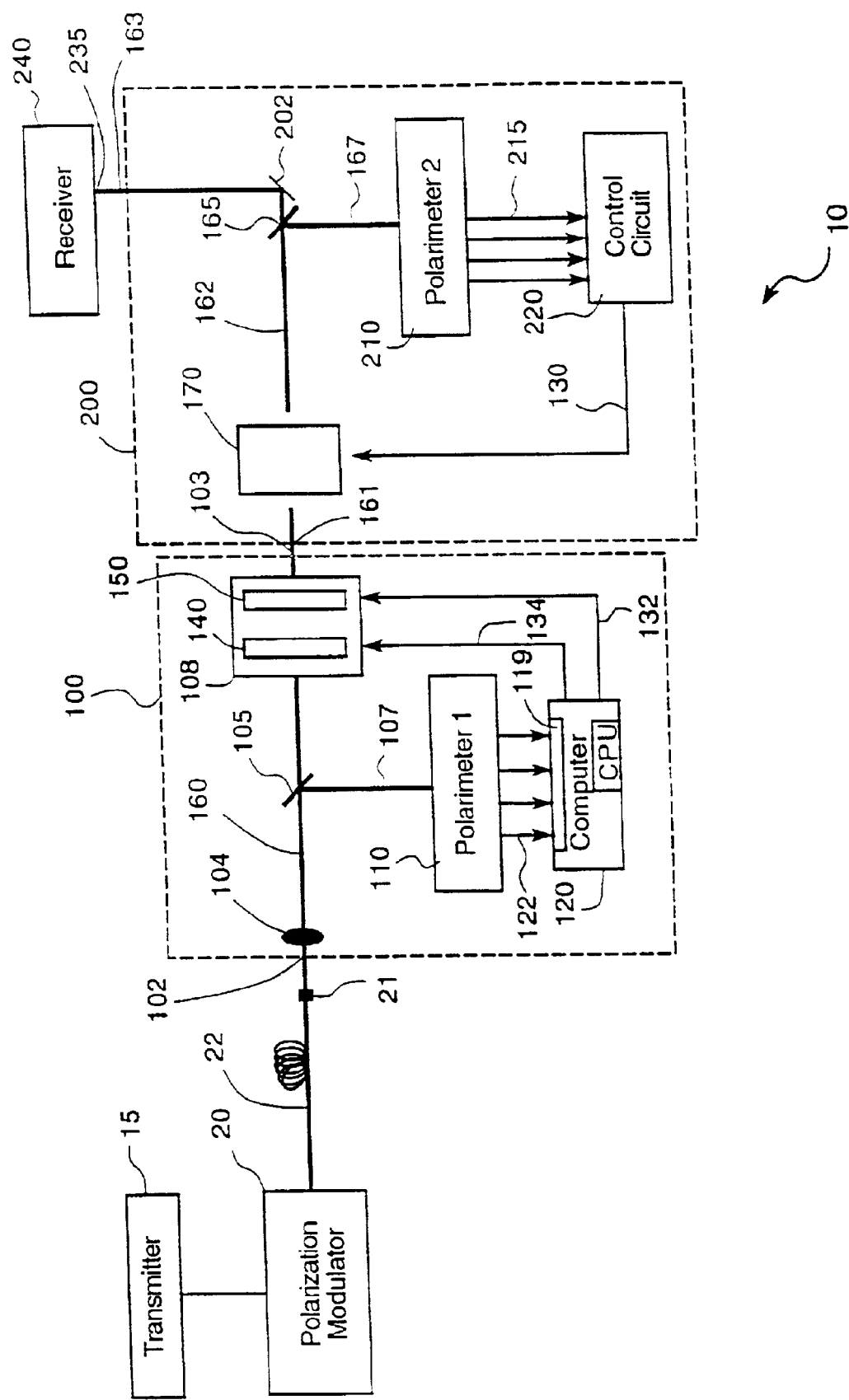
FIG. 1 is a block diagram of a PMD compensating apparatus.

Referring to FIG. 1, compensating apparatus 10 includes a polarization controller 100 and a delay controller 200. Compensating apparatus 10, when placed between an output 21 of an optical fiber 22 and an input 235 of optical receiver 240, reduces the PMD of optical signals transmitted by optical transmitter 15 though optical fiber 22.

Polarization controller 100 includes a lens 104, a beam splitter 105, a polarimeter 110, and a polarization transformer 108. Lens 104 positioned at an input 102 of polarization controller 100 collimates optical signals (not shown) from output 21 of optical fiber 22 along an optical path 160. Optical path 160 extends from input end 102, through beam splitter 105, polarization controller 108, and out output end 103. Beam splitter 105 redirects a portion of the optical signal propagating along beam path 160 into polarimeter 110 which detects the redirected optical signals and sends a series of electronic signals through cables 122 to an I/O port 119 of a computer 120. Computer 120 uses the electronic signals in an algorithm stored in the computer's CPU to determine the principal states of polarization (PSPs) of optical fiber 22 and sends control signals to modify the settings of a first retarder 140 and a second retarder 150 in polarization transformer 108. First retarder 140, e.g., a quarter-waveplate, and second retarder 150, e.g., a half-waveplate, transform the polarization of the PSP such that light exiting polarization controller 100 is linearly polarized and aligned to the x- and y-axis of delay controller 200.

Delay controller 200 includes a delay module 170, a beam splitter 165, a polarimeter 210, a controller 220, and a mirror 202. An optical beam path 162 extends between an input 161, through delay module 170, and beam splitter 165. Mirror 202 reflects optical signals out of delay controller 200 through output 163 and into input 235 of receiver 240. Beam path 162 at input 161 is collinear with beam path 160 from polarization controller 100 such that collimated optical signals exiting output end 103 propagate along beam path 162.

After the optical signals pass through delay module 170, beam splitter 165 redirects a portion of the optical signal propagating along beam path 162 into polarimeter 210. Polarimeter 210 detects the redirected optical signals and sends a series of electronic signals via cables 215 to a control circuit 220. Polarimeter 210 is similar in structure to polarimeter 110 described below. Control circuit 220 uses the electronic signals sent from polarimeter 210 to determine the time delay between the PSPs in optical fiber 22 and then sends a control signal via cable 130 to delay controller 170. The control signal modifies the settings of delay controller 170 such that the time delay is reduced between the two PSPs transmitted through outlet 21 of optical fiber 22.

Figure 2:
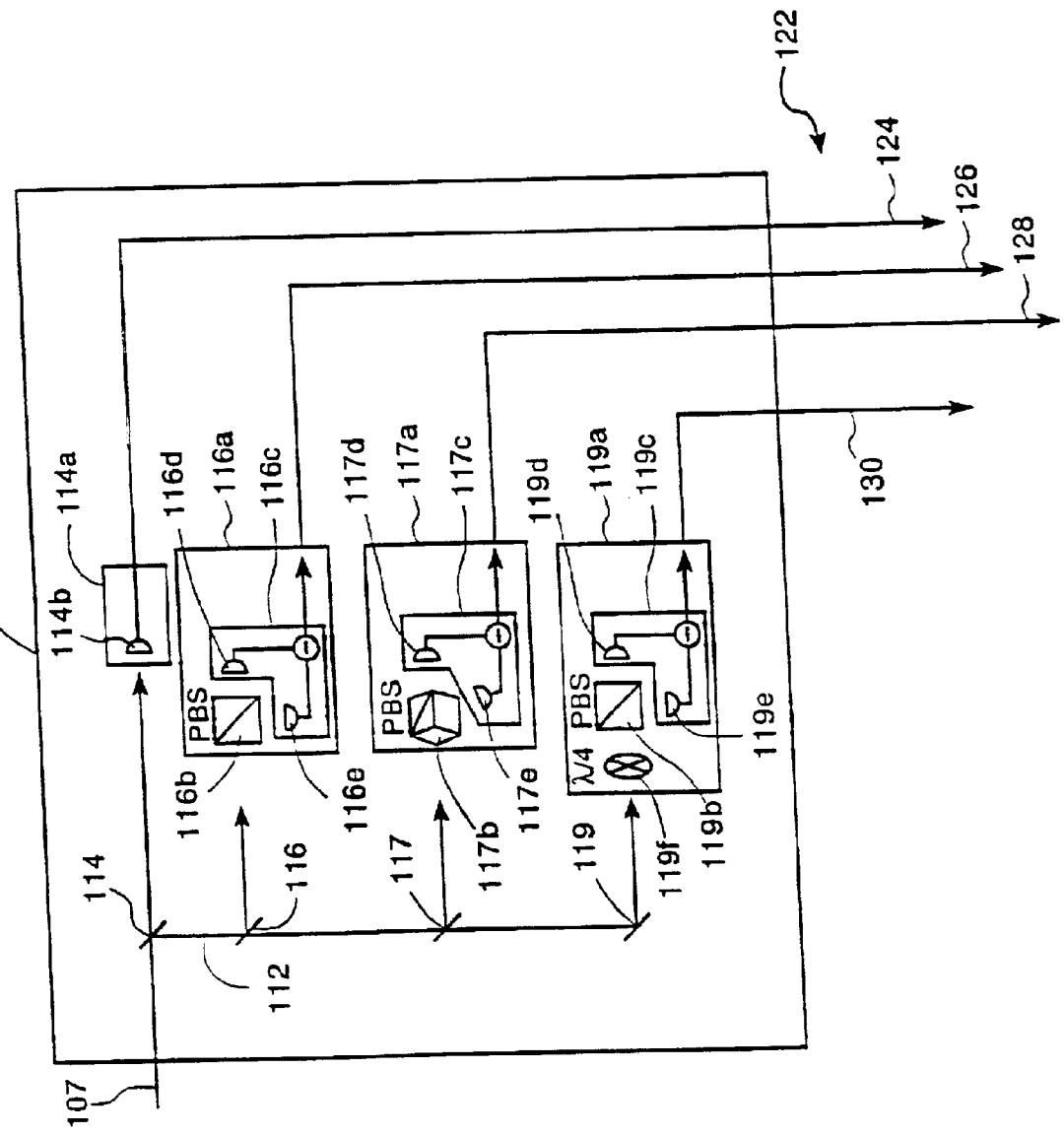
FIG. 2 is a block diagram of a polarimeter shown in FIG. 1.

Referring to FIG. 2, polarimeter 110 includes three beam splitters 114, 116, 117, and a mirror 119 spaced along an optical beam path 112. Beam splitters 114, 116, 117, and mirror 119 couple optical signals propagating along beam path 112 towards detector modules 114a, 116a, 117a, 119a, respectively. Detector module 114a includes a detector 114b for measuring the total power of an optical signal. Detector module 116a includes a polarizing beam splitter 116b and a detector assembly 116c having a first detector 116d and a second detector 116e. Similarly, detector module 117a includes a polarizing beam splitter 117b and a detector assembly 117c. Detector module 119a includes a polarizer 119f, e.g., a quarter-waveplate, a polarizing beam splitter 119b, and a detector assembly 119c. Each detector module measures specific optical properties of the optical signal and sends an electronic signal proportional to each measured property to computer 120 via cables 122.

Figure 3:
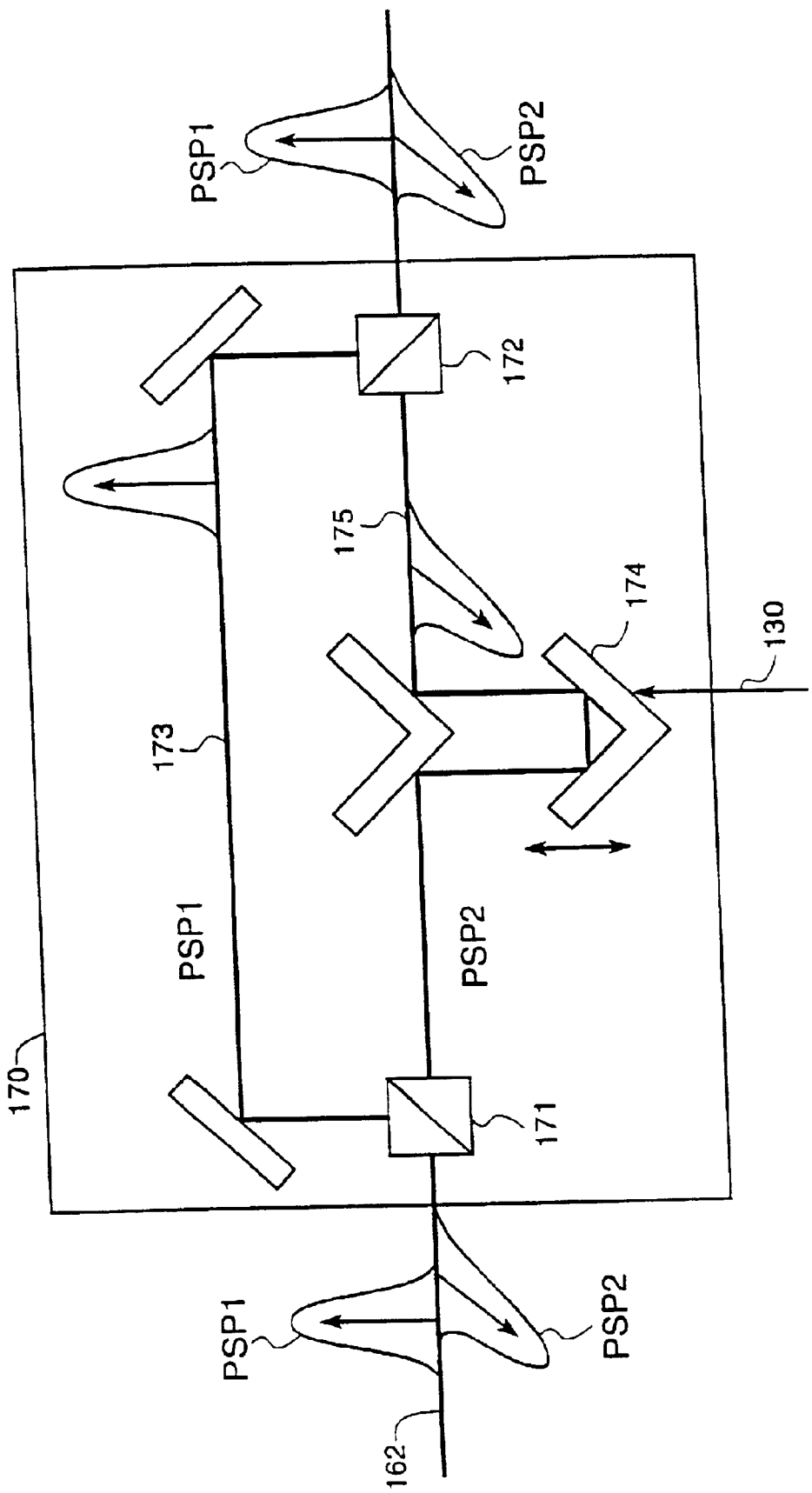
FIG. 3 is a block diagram of a delay module shown in FIG. 1.

Referring to FIG. 3, delay module 170 includes an input polarizing beam splitter 171, an optical delay assembly 174, and an output polarizer 172. Polarizing beam splitter 171 separates the two PSPs transmitted through optical fiber 22 and polarization controller 100 such that PSP1, delayed with respect to PSP2, propagates along a fixed optical path 173 to polarizing beam splitter 172, and PSP2 propagates along a variable optical path 175. Variable optical path 175 includes optical delay assembly 174, e.g., a translatable (Arrows) mirror, which delays PSP2 with respect to PSP1. PSP1 and PSP2 recombine in polarizing beam splitter 172 and continue propagating along beam path 162.

Figure 4:
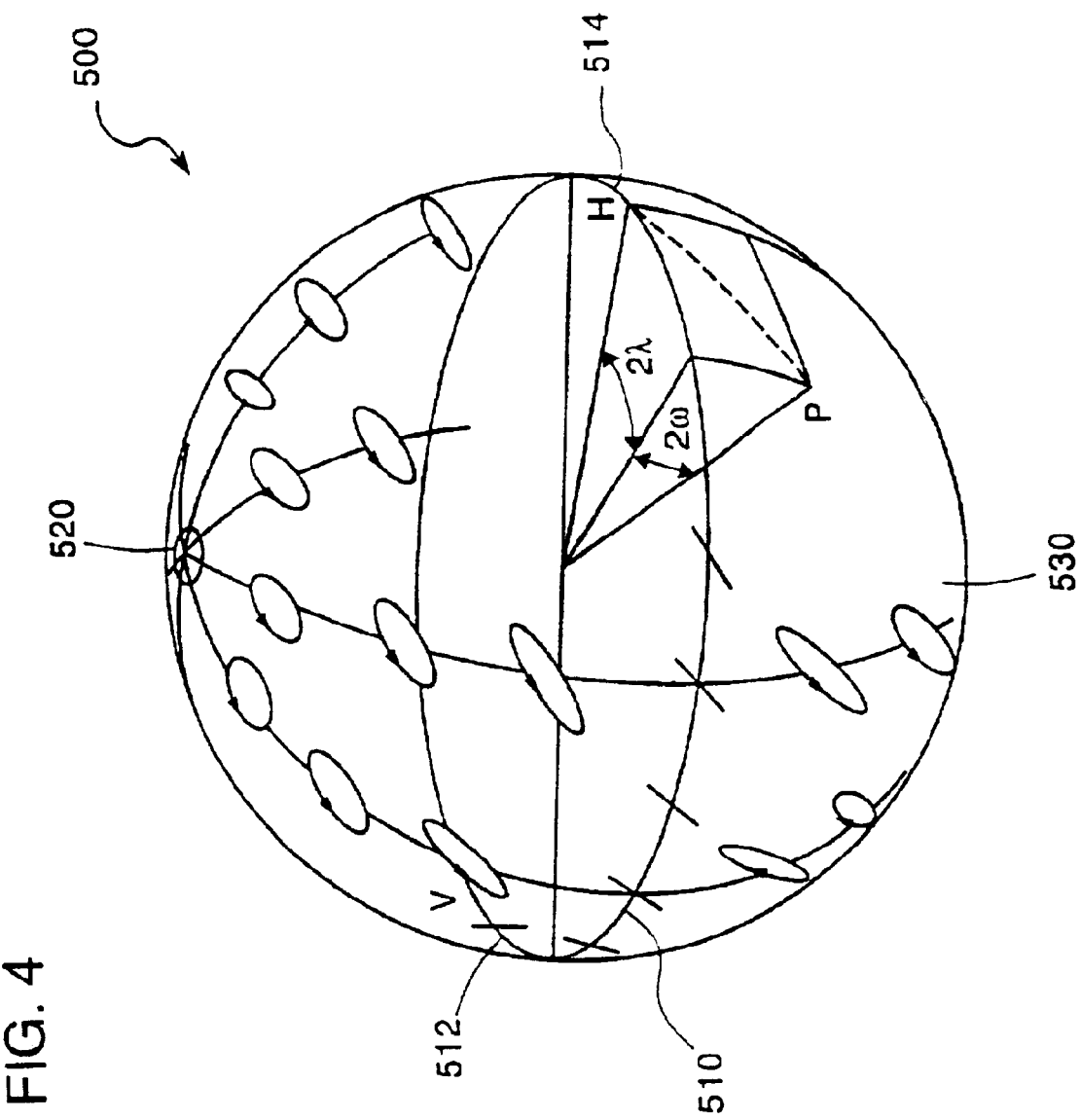
FIG. 4 is a schematic representation of a Poincaré sphere.

Referring to FIG. 4, a convenient and intuitive graphical representation of SOPs is a Poincaré sphere 500. A SOP is defined in terms of a Stokes vector of Formula 1:

$$\langle S_0 S_1 S_2 S_3 \rangle \quad (1)$$

where $$S_0 = E^2_x + E^2_y \quad (2)$$

$$S_1 = E^2_x - E^2_y \quad (3)$$

$$S_2 = 2E_x E_y \cos(\varnothing) \quad (4)$$

$$S_3 = 2E_x E_y \sin(\varnothing) \quad (5)$$

and $E_x$ and $E_y$ are the magnitudes of the x and y component electric field complex amplitudes, respectively. $\varnothing$ is the relative phase between the two. The parameters $s_1$, $s_2$ and $s_3$ are represented by the relationship $s_i=(S_i)/(S_0)$, where i is 1, 2, or 3, and can be used to convert the Stokes parameters to corresponding x, y, and z components in a three dimensional Cartesian coordinate system. In a three dimensional Cartesian coordinate system, Poincaré sphere 500 is defined by a set of points containing all possible SOPs. As seen in FIG. 4, all linear polarization states are located on an equator 510 of sphere 500, while left and right circular polarizations are located at a north pole 520 and a south pole 530, respectively. All other points represent elliptical polarizations which lie away from equator 510 and poles 520, 530. Each SOP on sphere 500 is identifiable by its latitude 2w and longitude 2λ by using equations:

$$s_1 = \cos(2w)\cos(2\lambda) \quad (6)$$

$$s_2 = \cos(2w)\sin(2\lambda) \quad (7)$$

$$s_3 = \sin(2w) \quad (8)$$

where any two orthogonal SOPs lie directly opposite each other, e.g., a linear vertical polarization 512 is 180 degrees away from a linear horizontal polarization 514 on equator 510.

In operation, transmitter 15 sends a polarized optical signal to polarization modulator 20 which modulates the state of polarization ("SOP") of the optical signal, e.g., from vertical to right circular to elliptical, with a frequency of about 10 kHz to about 100 MHz. The modulating frequency is fast enough to measure and compensate varying PMD on a millisecond timescale. The modulating frequency is limited by the response time of the detectors used in the polarimeters.

Figure 5A:
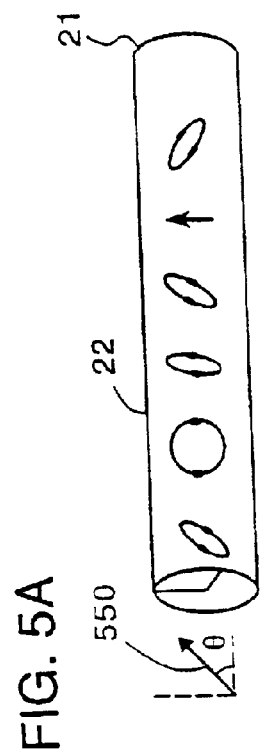
FIG. 5A is a schematic representation of an optical signal propagating through an optical fiber of FIG. 1.
Figure 5B:
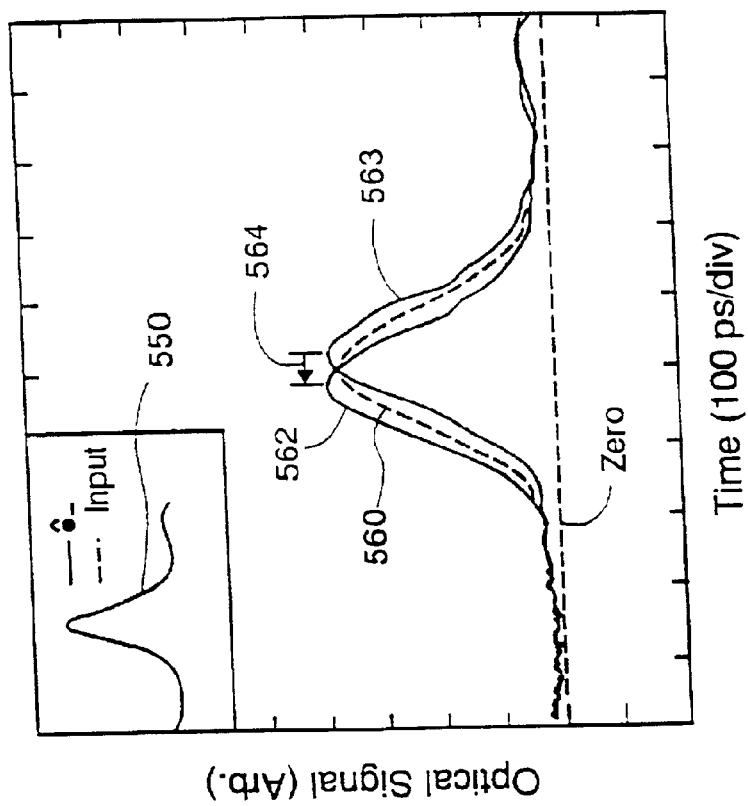
FIG. 5B is a graphical representation of the optical signal propagating through an optical fiber of FIG. 1.

Referring to FIG. 5A, as an input SOP 550 propagates from polarization modulator (not shown) through optical fiber 22 towards output 21, the SOP of the signal randomly changes. Each SOP propagates through the optical fiber at a different speed, e.g., some SOPs travel faster and some travel slower, resulting in a varying pulse width distortion of an optical signal 560 at output 21. To a first order approximation, optical fiber 22 has two discrete group delays, one for each of two orthogonal PSPs, i.e., PSP 562 and PSP 564. Referring to FIG. 5B, optical signal 560, a SOP, is a linear combination of PSP 562 and PSP 564. A time delay 565, e.g., 40 ps, between PSP 562 and PSP 564 creates PMD in the output signal, i.e., the width of signal 560 is greater than signal 550.

At outlet 21, optical signal 560 propagates into compensating apparatus 10 which reduces the PMD in signal 560 with polarization controller 100 and delay controller 200. Polarization controller determines the PSPs of the optical fiber 22 and transforms the two PSPs to x and y linearly polarized states aligned with the x and y optical axis of delay module 170. Delay controller 200 measures the time difference between the two transformed PSPs and delays one PSP relative to the other.

After exiting optical fiber 22, optical signal 560 travels through polarization controller 100 along beam path 160, until beam splitter 105 redirects a portion, e.g., about 1%, of the optical signal into polarimeter 110 for analysis. The amount of optical signal redirected into polarimeter is sufficient such that the redirected optical signal is measurable by each of the detectors in polarimeter 110.

Referring back to FIG. 2, beam splitters 114, 116, 117 evenly divide the optical signal entering polarimeter 110 into four separate optical signals. Detector module 114a measures the power of the first optical signal, i.e., So. Detector module 116a analyses the second signal by measuring the difference between optical signals having polarization components oriented in the x and y direction, i.e., $S_1=E^2_x-E^2_y$. Optical signals having only x oriented polarization components result in a measurement of +1 by detector module 116a, and optical signals having only y oriented polarization components result in a measurement of −1. Detector module 117a analyzes the third signal by measuring the difference between optical signals having polarization components oriented 45 degrees with respect to the x and y direction, i.e., $S_2=E^2_{+45}=2E_xE_y\cos(\emptyset)$ (where $\emptyset$ is the phase between $E_x$ and $E_y$). Detector module 119a analyzes the fourth signal by measuring the difference between optical signals having left and right circular polarization components, i.e., $S_3=2E_xE_y\sin(\emptyset)$ where $\emptyset$ is the phase between $E_x$ and $E_y$. Optical signals having only right circular polarization results in a measurements of +1, and left circular polarization results in a measurement of −1. Polarimeter 110 measures each of the Stokes parameters, Equations 2–5, and sends electronic signals proportional to each measurement to computer 120.

Figure 6:
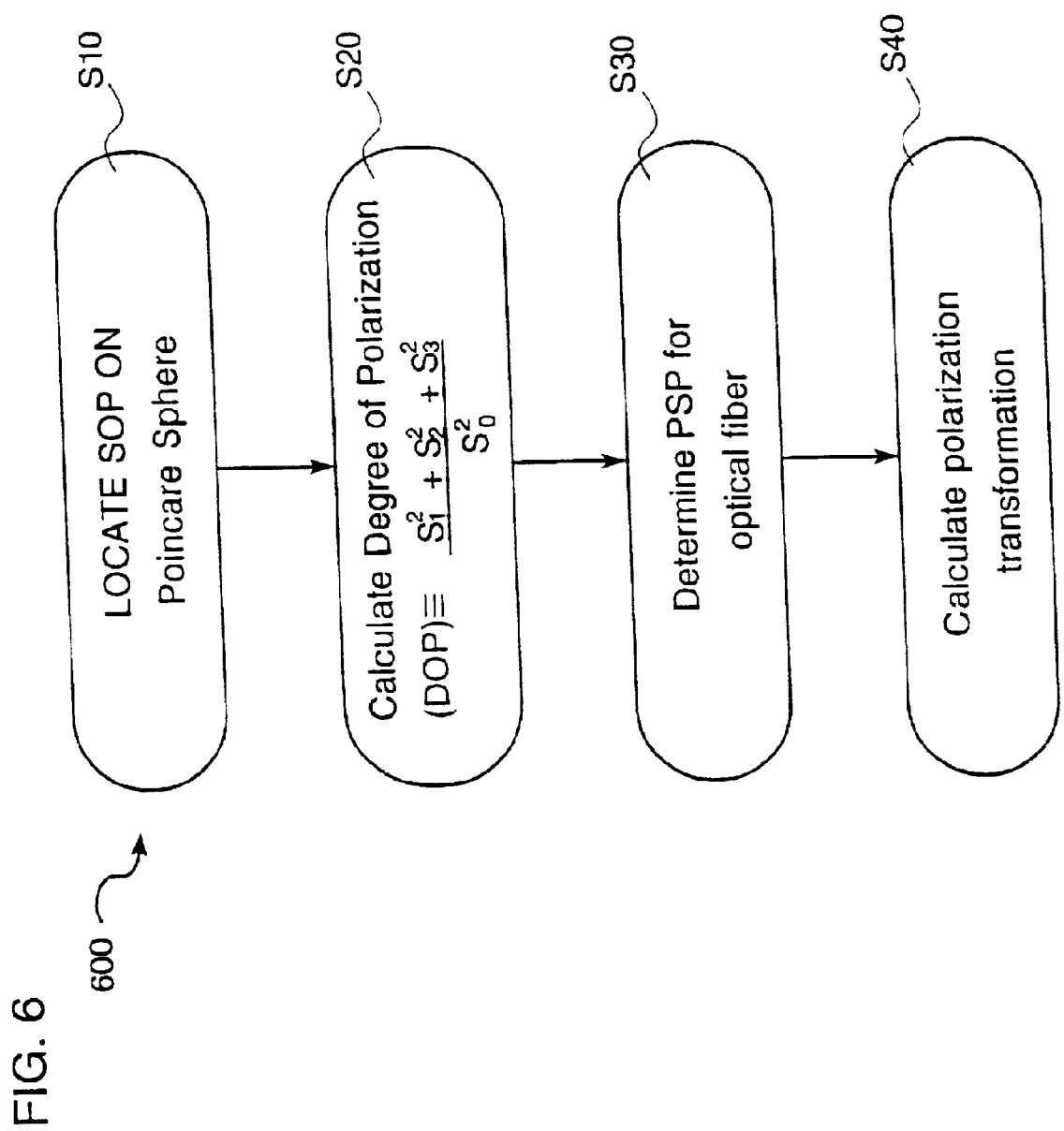
FIG. 6 is a schematic flow chart of the PSP algorithm.

Referring to FIG. 6, computer 120 receives the electrical signals from polarimeter 110 and runs an algorithm 600 stored in the computer's CPU to determine the location of the SOP on a Poincaré sphere (S10), to calculate a degree of polarization (DOP) for each SOP (S20), to determine the two orthogonal PSPs for the optical fiber (S30), and to calculate a polarization transformation which converts the PSPs of the fiber to linear x and y polarization states aligned with the x and y optical axis of delay module 170 (S40).

The CPU determines the location of the SOP on the Poincaré sphere by relating each of the electrical signals from the polarimeter to its corresponding Stokes parameter, equations 6–8, and then calculating w and λ, i.e., the coordinates of the SOP on the Poincaré sphere. Each of the Stokes parameters is also used by the CPU to calculate degree of polarization (DOP). The ratio of Stokes parameters shown below $$DOP^2 = \frac{S_1^2 + S_2^2 + S_3^2}{S_0^2} \quad (9)$$

is less than or equal to unity.

Figure 7A:
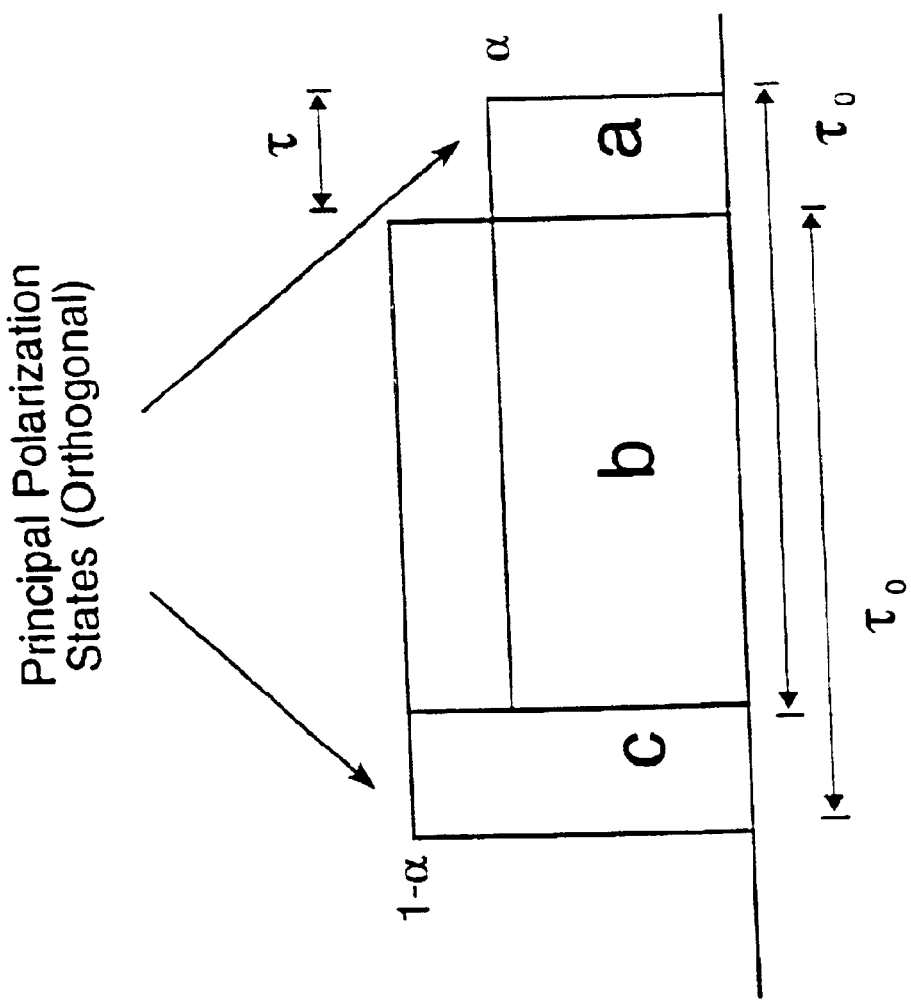
FIG. 7A is a schematic representation of the principal states of polarization of an optical signal propagating through an optical fiber of FIG. 1.

Referring to FIG. 7A, two PSPs, i.e., square shaped pulses of length to, have a first order PMD delay of τ and a relative power with respect to each other described by the parameter α. To a first order approximation, i.e., when $\tau/\tau_0$ is less than 1, the DOP of the two square PSPs, equation 9, can be rewritten as a function of delay, τ, and relative power, α:

$$DOP(\tau,\alpha)=[1+4\alpha(\tau/\tau_0)((\tau/\tau_0)-2)(1-\alpha)]^{1/2}. \quad (10)$$

A plot of Equation 10 (FIG. 7B) graphically shows how DOP depends on delay and relative power of the PSPs. At constant delay, τ, DOP is at a minimum when both PSPs have equal power, whereas DOP is at a maximum when only one PSP has all of the power, i.e., α is 1 or 0, respectively. At constant relative power, α, DOP is inversely related to the delay between the two PSPs. At a constant time delay between the two PSPs, the DOP depends on the SOP. When the SOP is a 50/50 mixture of both PSPs, i.e., each PSP has equal power, the DOP will be at a minimum, whereas the DOP will be unity when the SOP is aligned with one PSP, i.e., one PSP has all the power. As the value of $\tau/\tau_0$ approaches 1, the first order approximation of PMD fails and equation 10 is no longer valid.

Figure 8:
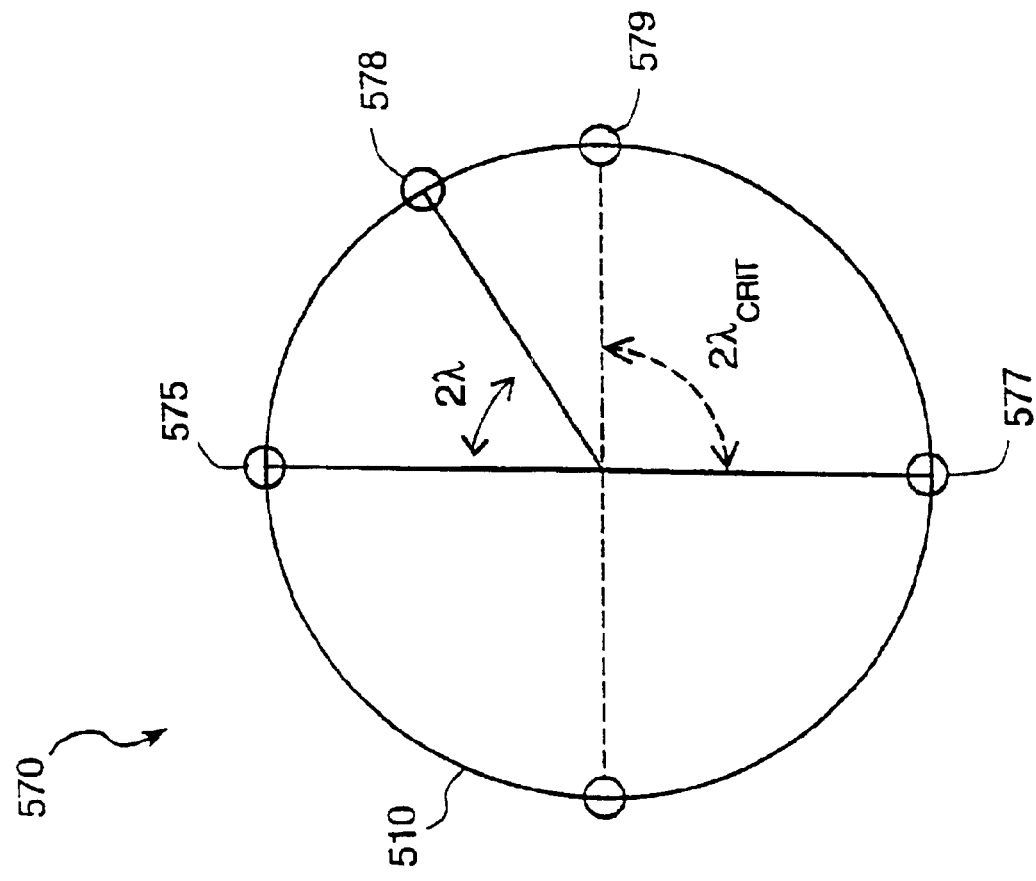
FIG. 8 is a cross-sectional view of the Poincaré sphere of FIG. 4 taken along the equator.

Referring to FIG. 8, the linear polarization states represented by circle 570 are synonymous with equator 510 of the Poincaré sphere 500 (see FIG. 4). Assuming that optical fiber 22 includes an x-horizontal linear PSP 575 and the y-vertical linear PSP 577, i.e., two orthogonal PSPs, all other points on the circumference of circle 570 represent linear states at different orientations. A SOP 578 represents one possible linear SOP of an optical signal of optical fiber 22. SOP 578 contains components of both x and y polarizations, i.e., SOP 578 is a weighted linear combination of PSP 575 and PSP 577. Depending on the amount of time delay between PSP 575 and PSP 577, SOP 578 has a DOP that is less than or equal to unity. As the angular distance, 2λ, of SOP 578 to a PSP decreases, DOP increases. At the critical angular distance, $2\lambda_{crit}$, a SOP 579 is equally distant from PSP 575 and PSP 577, i.e., SOP 579 is a 50/50 mixture of PSP 575 and PSP 577, resulting in a minimum DOP. The definitions of the Stokes parameters, such as $S_1$, provide a relation between α and the radial distance 2λ such that Equation 10 takes the form.

$$DOP(\tau, 2\lambda) = \left[\frac{1+\frac{\tau}{\tau_0}\left(\frac{\tau}{\tau_0}-2\right)}{1+\frac{\tau}{\tau_0}\left(\frac{\tau}{\tau_0}-2\right)\cos^2(2\lambda)}\right]^{\frac{1}{2}}. \quad (11)$$

In general, the DOP is a function of 2λ', the angular distance between the SOP and any PSP on the Poincaré sphere. 2λ' is a function of the longitude distance, 2λ, and the latitude distance, 2w. Using the definitions of the Stokes parameters, Equation 10 is rewritten in the form.

$$DOP(\tau, 2\lambda') = \left[\frac{1 + \frac{\tau}{\tau_0}\left(\frac{\tau}{\tau_0} - 2\right)}{1 + \frac{\tau}{\tau_0}\left(\frac{\tau}{\tau_0} - 2\right)\cos^2(2\lambda')}\right]^{\frac{1}{2}} \quad (12)$$

If the PSPs of an optical fiber are unknown, computer 120 runs algorithm 600 while polarization modulator 20 changes the SOP. For each SOP, algorithm 600 calculates both the location of the SOP on the Poincaré sphere and the DOP. The algorithm sends these values into memory and repeats the cycle. Algorithm 600 stops collecting data points and fits, e.g., by linear-least-squares, the data in memory to find the maximum DOP, i.e., a DOP of unity corresponds to a SOP which represents one of the PSPs. Algorithm 600 collects enough data points so that the DOP as a function of SOP is well represented. Collecting too few data points leads to incorrect fitting results, whereas collecting too many data points is time consuming and allows environmental changes, i.e., temperature and stress on the fiber, to affect the location of the PSPs on the Poincaré sphere. Once the CPU calculates the identity of the PSPs, algorithm 600 calculates a polarization transformation necessary to transform the PSPs into linearly polarized x-horizontal and y-vertical PSPs aligned to the x-horizontal and y-vertical axis of delay module 170.

Algorithm 600 uses Stokes parameters and Jones matrices representing the PSP polarization states, retarder 140, and retarder 150 to calculate the settings of the retarders which transform the PSPs into linear horizontal and vertical states. Algorithm 600 begins with an arbitrary polarization state A $$A = \begin{bmatrix} \delta \\ \varepsilon e^{i\varphi} \end{bmatrix} \quad (13)$$

where $\delta^2 + \epsilon^2 = 1$, and a horizontal polarization state, i.e., a x-horizontal state, is represented by the Jones matrix, $$x - \text{horizontal} = \begin{bmatrix} 1 \\ 0 \end{bmatrix} \quad (14)$$

The angle, A, between a major axis of the arbitrary state and the axis of a Cartesian coordinate system is $$A = 2\tan^{-1}[(2\delta\epsilon\cos(\varphi))/\delta^2 - \epsilon^2)]. \quad (15)$$

Algorithm 600 converts the known PSPs from Cartesian coordinates into Jones matrices, and determines A.

Once A is known, Algorithm 600 calculates how to orient retarder 140 to convert the PSPs into linearly polarized states having an angle, A, between the x-axis of the Cartesian coordinate system and the axis of the linearly polarized states. Next, Algorithm 600 calculates how to orient retarder 150 to rotate, i.e., by β, the linearly polarized states so that they coincide with x-horizontal and y-vertical polarization states.

A complete transformation of an arbitrary state into a linearly x-horizontal polarization state using a quarter-waveplate as retarder 140 and a half-waveplate as retarder 150 is $$[R(-\beta/2) \times HW \times R(\beta/2)] \times [R(-A) \times QW \times R(A)] \quad (16)$$

where $$R(D) = \begin{bmatrix} \cos(D) & \sin(D) \\ -\sin(D) & \cos(D) \end{bmatrix}, \quad (17)$$

$$HW = \begin{bmatrix} i & 0 \\ 0 & -i \end{bmatrix}, \text{ and} \quad (18)$$

$$QW = \begin{bmatrix} e^{i\Pi/4} & 0 \\ 0 & e^{-i\Pi/4} \end{bmatrix}. \quad (19)$$

The computer sends electrical control signals, based on the transformation calculations, both to retarder 140 to transform the PSPs to linear PSPs and to retarder 150 to rotate the linear PSPs to the x-horizontal and y-horizontal axis of the delay module.

The transformed optical signal propagates into delay module 170. Referring back to FIG. 3, polarizing beam splitter 171 redirects x-horizontally polarized optical signal, i.e., PSP 2, through a variable delay line and y-vertically polarized optical signal, i.e., PSP 1, through a fixed delay line. Polarizing beam splitter 172 recombines the x-horizontally and y-vertically polarized optical signals. Before the recombined signal exits delay controller 200, beam splitter 165 redirects a portion of the optical signal into polarimeter 210. Polarimeter 210 is similar to polarimeter 110 described above and sends electrical signal proportional to the stokes parameters to control circuit 220.

The control circuit, e.g., a microprocessor, calculates the DOP of the recombined signal. As shown in Equation 10, DOP is a function of both the time delay, τ, and the SOP of the optical signal, i.e., the relative power, α, of each PSP. Control circuit 220 calculates DOP and determines a time average DOP as polarization modulator 20 modulates the SOP of the input optical signal and the relative power, α, of each PSP. Referring back to FIG. 7b, the time averaged DOP, i.e., as α changes between values of 0 and 1, is at maximum for zero delay between PSP1 and PSP2, whereas the time averaged DOP decreases as the delay between the PSPs increases. Control circuit 220 sends electrical signals to delay assembly 174 to adjust the time delay between PSP1 and PSP2 such that the time averaged DOP is maximized.

Control circuit 220 averages the DOP for a time period that is sufficient to characterize the DOP for several SOPs. The shortest DOP averaging time period is set by the rate at which polarization controller 100 aligns the PSPs to the x- and y-axis of the delay module. At longer time periods, collecting too many data points is time consuming and allows environmental changes, i.e., temperature and stress on the fiber, to affect the location of the PSPs on the Poincaré sphere.

Figure 9:
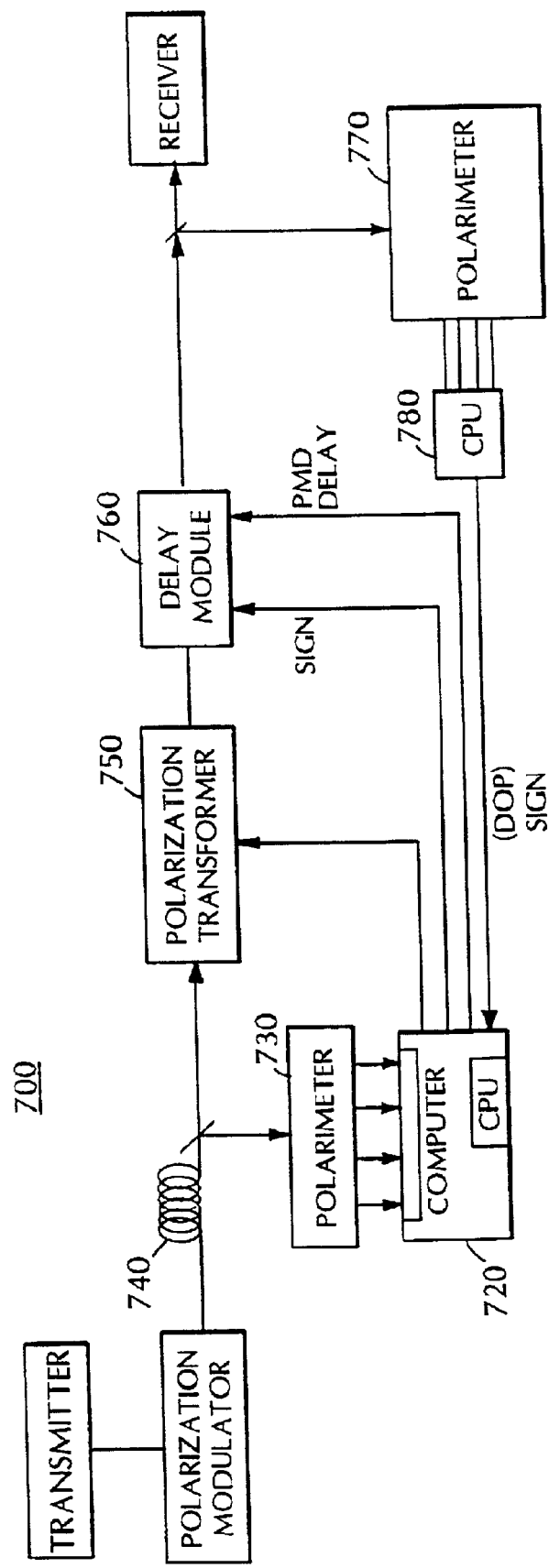
FIG. 9 is a block diagram of another PMD compensating apparatus.

In an alternative embodiment, referring to FIG. 9, a CPU 720 of a compensating apparatus 700 receives electrical signals from a polarimeter 730 and a control unit and runs an algorithm, as will be described below, to determine the location of the two PSPs of optical fiber 740 on the Poincaré sphere, and the magnitude of PMD time delay between and the relative order, in time, of the two PSPs. The Control unit includes a DOP sensor 770, such as a polarimeter or a spectrum analyzer, and a CPU 780. DOP sensor 770 monitors a portion of the optical signal exiting a delay module 760 and sends electric signals to CPU 780. CPU 780, in turn, calculates a value of DOP, $DOP_{SIGN}$, based on the electric signals sent from DOP sensor 770 and sends an electrical signal proportional to $DOP_{SIGN}$ back to CPU 720. CPU 720, in turn, uses this value of $DOP_{SIGN}$ to determine the relative order, in time, of the two orthogonal PSPs, e.g., which PSP leads and which PSP trails.

During operation, CPU 720 determines which PSP is leading and which is trailing by comparing two different $DOP_{SIGN}$ values, one $DOP_{SIGN}$ value determined when the delay module retards one PSP and the other $DOP_{SIGN}$ value determined when the delay module retards the other PSP. A higher $DOP_{SIGN}$ value corresponds to less PMD time delay and a correctly retarded PSP. When the wrong PSP is delayed, i.e., the trailing PSP is further delayed in time relative to the leading PSP, the PMD time delay increases and the $DOP_{SIGN}$ value decreases. Typically, CPU 720 records and compares two values of $DOP_{SIGN}$ at a rate faster than the rate at which PMD changes in the optical fiber. After determining which PSP is leading and which is trailing, CPU 720 continuously monitors the $DOP_{SIGN}$ value calculated by CPU 780 to determine whether or not the leading and trailing PSPs have switched order. If the PSP order switches, the $DOP_{SIGN}$ value will decrease because the delay module will further delay the "new" trailing PSP thereby generating more PMD time delay between the two PSPs. When CPU 720 detects a decrease in the $DOP_{SIGN}$ value, the CPU uses this information to generate electric signals which when sent to a polarization transformer 750 cause the transformer to rotate the PSPs relative to the delay module such that the delay module will retard the "new" trailing PSP. Alternatively, without rotating the polarization of the PSPs, CPU 720 can send an electric signal to the delay module causing the module to change which PSP is retarded, such as by changing the optical path delay. See FIG. 3.

CPU 720 runs an algorithm that records electric signals from the polarimeter and the control unit and stores these values into memory. The algorithm processes the stored values from the polarimeter to determine where the PSPs of the optical fiber are located on the Poincaré sphere and the magnitude of the time separating the two PSPs. The algorithm also processes the stored values from the control unit, as discussed above, to determine the relative order of the PSPs. Once CPU 720 has determined the location of the PSPs and identified the leading and trailing PSP, CPU 720 calculates a polarization transformation that will orient the PSPs relative to a delay module 760 such that the module will retard the leading PSP relative to the trailing PSP. CPU 720, in turn, sends electrical signals to polarization transformer 750 to produce the calculated polarization transformation. CPU 720 determines which electric signals will generate the desired transformation by using a lookup table containing input polarizations, values of applied electric signal voltages, and output polarizations. The lookup table can be preprogrammed by a system user into CPU 720 prior to operation or determined via a calibration procedure described below. After determining the magnitude of the PMD time delay, CPU 720 sends electrical signals to delay module 760 to set the overall magnitude of time delay between the two PSPs.

CPU 270 processes each of the signals from the polarimeter to generate a time averaged state of polarization of a stokes vector, $\vec{r}$. CPU 270 uses the time averaged state of polarization to extract an estimate of the location of the PSPs and the magnitude of their separation via a pertubative expansion of $\vec{r}$.

$$DOP^2 \equiv |\vec{r}|^2 = |\vec{S}_{0,\parallel}|^2 + (1-\Delta\omega^2_{pulse}\tau^2_{PMD})|\vec{S}_{0,\perp}|^2 + O\{\Delta\omega^3\} \quad (20)$$

where $\vec{r}$ is the time averaged state of polarization of a stokes vector measured by the polarimeter, $\vec{s}_{0,\parallel}$ and $\vec{s}_{0,\perp}$ are two components of the SOP, $\omega^2_{pulse}$ is the signal bandwidth, $\tau^2_{PMD}$ is the magnitude of the PMD time delay and can be expressed as $|\Omega|^2$, and $O\{\Delta\omega^3\}$ represents higher-order terms of the pertubative expansion. Equation 20, minus the higher-order terms, $O\{\Delta\omega^3\}$, is equivalent to equation 10 and is generated by starting with a two-mode, pure-polarization input field, written $a(t)$. $a(t)$ is transformed by an optical fiber into an output field $b(t)$, expressed as $$b(t) = T(w)a(t) = \int \frac{dw}{2\pi} f(w) e^{-iwt} T(w) a_0 \quad (21)$$

where $f$ is the signal spectrum and $a_o$ is a complex 2-dimensional vector. The time averaged state of polarization is represented by $$\vec{r} \equiv \int dt b^t(t) \vec{\sigma} b(t) \quad (22)$$

where $\vec{\sigma}$ is a vector of Pauli matrices. Using equations 21 and 22, the time averaged state of polarization can be expressed as $$\vec{r} = \int \frac{d\omega}{2\pi} |f(\omega)|^2 a_o^t T^t(\omega) \vec{\sigma} b(t) \equiv \int \frac{d\omega}{2\pi} |f(\omega)|^2 \vec{s}(\omega) \quad (23)$$

PMD is characterized by a (Stokes-space) PMD vector, $\vec{\Omega}$, which can be defined by the relation $$\frac{d\vec{s}}{d\omega} = \vec{\Omega}(\omega) \times \vec{s}(\omega) \quad (24)$$

By using equation 24, and by defining a center of the signal spectrum $\omega_0$ as $$\int \frac{d\omega}{2\pi} |f(\omega)|^2 (\omega - \omega_0) \equiv 0$$

and a nominal SOP as $$\vec{s}_0 \equiv a_0^t T^t(\omega_0) \vec{\sigma} T(\omega_0) \equiv 0,$$

a perturbative expansion for time averaged state of polarization can be expressed as $$\vec{r} = \vec{s}_0 - \frac{\Delta\omega^2_{pulse}}{2} [\vec{\Omega}_\omega \times \vec{s}_0 + \vec{\Omega} \times (\vec{\Omega} \times \vec{s}_0)] + O\{\Delta\omega^3\} \quad (25)$$

where the signal bandwidth is characterized by $\Delta\omega^2_{pulse} \equiv \int |dw| |f(w)|^2 (w-w_0)^2/2\pi$.

The $\vec{\Omega} \times \vec{\Omega} \times$ term can be described physically as a reduction of components orthogonal to $\vec{\Omega}$ due to first-order PMD and the $\vec{\Omega}_w \times \vec{s}_0$ term can be described physically as a rotation due to second-order PMD. Rearranging equation 25 yields $$\vec{r} = \vec{s}_0 - \frac{1}{2} \Delta\omega^2_{pulse} \tau^2_{PMD} \vec{s}_{0,\perp} + \frac{1}{2} \Delta\omega^2_{pulse} \vec{\Omega}_\omega \times \vec{s}_0 + O\{\Delta\omega^3\} \quad (26)$$

Using equation 26, the physical effects of PMD of the optical fiber on an SOP can be described physically as generating a rotation and a rescaling of the SOP:

$$\vec{r} = [\text{Rotate}(\vec{\Omega}_{107})][\text{Scale}(\vec{\Omega})] \vec{s}_0. \quad (27)$$

In terms of first-order PMD, a rescaling means that DOP is a function of the angle between $\vec{s}_0$ and $\vec{\Omega}$. Although discussed in terms of first- and second-order PMD, the perturbative expansion for time averaged state of polarization can be used to develop analytical models for higher-order PMD which can be used to extract higher-order PMD parameters from DOP measurements. For instance, a CPU in a PMD compensating apparatus capable of compensating higher-order PMD can use the higher-order PMD parameters derived from equation 20 to generate control signals to reduce higher-order PMD in the optical signal.

For simplicity, we limit our discussion to first-order PMD calculations. Given a number, N, of time-averaged SOP measurements $r_1, \ldots, r_k$, resulting from unknown and varying input polarization input fields $a_0$, the samples, $r_k$ ideally obey the relation $$DOP = |\vec{r}_k| = \frac{1 - |\vec{a}|^2}{|\vec{r}_k - (\vec{a} \cdot \hat{r}_k)\vec{a}|} \quad (28)$$

for first-order PMD, where $\vec{a}$ is an unknown vector to be estimated by the CPU. In Stokes space, $|\vec{r}_k|$ forms the surface of an ellipsoid within the Poincaré sphere whose major axis is aligned with the PSP directions $+\hat{a}$ and $-\hat{a}$. Vector $\vec{a}$ satisfies the relationship $(1-|\vec{a}|^2)^2 = 1 - \Delta\omega^2_{pulse} \tau^2_{pmd}$ which relates the magnitude of $\vec{a}$ to the PMD time delay between the PSPs.

The CPU can estimate the vector a by mathematical methods such as eigenvalue calculations or nonlinear curve-fitting. In nonlinear curve-fitting, the CPU records a series of DOP data, $r_k$, and coverts them into magnitudes, $d_k \square |\vec{r}_k|$ and directions $\hat{r}_k = \vec{r}/|\vec{r}|$. The CPU performs a nonlinear fit by minimizing the distance between the measured DOP ($d_k$) and the expected DOP ($f(\vec{r}_k, \vec{a})$). For example, the least-squares estimate of $\vec{a}$ is $$\vec{a}_{est1} = \underset{\vec{b}}{\arg\min} F_1(\vec{b}) \quad (29)$$

where $$F_1(\vec{b}) = \sum_k [d_k - f(\vec{r}_k, \vec{b})]^2 \quad (30)$$

$$f(\vec{r}_k, \vec{b}) = \frac{1 - |\vec{b}|^2}{|\vec{r}_k - (\vec{b} \cdot \hat{r}_k)\vec{b}|} \quad (31)$$

where the function $f(\hat{r}_k, \vec{b})$ gives the theoretical degree of polarization (DOP), or magnitude of $\vec{r}$.

In eigenvalue calculations, the CPU can estimate $\vec{a}$ by using matrix method techniques to maximize the second moment of the points on an unknown projection. Typically, CPU rescales the measured DOPs, $\vec{r}_k$, before performing moments calculations to artificially sharpen the contrast in DOP. CPU rescales the time-averaged SOP measurements via the relationship $$\vec{q}_k = S(|\vec{r}_k|)\hat{r}_k \quad (32)$$

where $S(|r_k|)$ is equal to $((DOP_k - DOP_{min})/1 - DOP_{min})$. CPU uses the scaled vectors, $q_k$, to calculate an estimate of the PSP axis $$\hat{a}_{est2} = \arg\min F_2(\hat{b}) \ |\hat{b}| = 1 \quad (33)$$

where $$F_2(\hat{b}) = \sum_k (\hat{b} \cdot \vec{q}_j)^2 \quad (34)$$

The function $F_2$ generally reaches a maximum near the direction of the PSPs, because PMD tends to pull the SOP towards this axis. CPU can also use the unscaled time-averaged DOP measurements, $\vec{r}$, to estimate $\vec{a}$, but large values of $DOP_{min}$ decrease the contrast between the measurements which, in turn, can decrease the precision of the method because random nonuniformities in the input polarizations can dominate the function $F_2$ and reduce the accuracy of determining $\vec{a}$. Equation 34 can be rearranged to provide $$F_2(\hat{b}) = b^T \left( \sum_k q_j q_j^T \right) b \equiv b^T M b \quad (35)$$

which reduces to the very simple form:

$$M\hat{a}_{est2} = \lambda \hat{a}_{est2} \quad (36)$$

equation 36 can be solved using Lagrange multipliers. The estimated â is the eigenvector corresponding to the largest eigenvalue of the 3×3 matrix M. The magnitude of the PMD time delay is equivalent to the magnitude of the vector $\vec{a}$. The CPU determines the magnitude of $\vec{a}$ by analyzing the statistics, such as mean and minimum, of the DOP data.

Random fluctuations in the density of sampled SOP's can effect the precision at which CPU determines the estimated $\vec{a}$. To increase precision, the CPU can record more samples. Recording more samples reduces the overall speed at which the compensating apparatus can reduce PMD in the optical signal. Alternatively, the CPU can increase precision by correcting random fluctuations in the density of a smaller subset of recorded samples. CPU reduces the random fluctuation by using a moment function to remove DOP:

$$D(\hat{b}) = b^T \left( \sum_k \hat{r}_j \hat{r}_j^T \right) b \equiv b^T M_2 b \quad (37)$$

The matrix method also has an advantage that much of the calculation can be performed in real-time as the CPU records data from the polarimeter. Each data point can be used to increment a matrix, M, with very few floating operations by continuously updating M to include new data and throw out old data. The CPU can update M using the relationship:

$$M^{(k)} = (1-\delta)M^{(k-1)} + q_j q_j^T \quad (38)$$

When using this scheme, the CPU can maintain an updated M at all times so that any calculations, such as an eigenvalue decomposition to estimate the PSPs, can keep pace with data acquisition.

The vector, $\vec{a}$, estimated by the CPU has three degrees of freedom, one degree for a magnitude of $|\vec{a}|$ and two degrees for the direction of $\vec{a}$. The relationship between the magnitude of vector $\vec{a}$ and the PMD vector, $\vec{\Omega}$, which also has three degrees of freedom, is $$\vec{\Omega} = \pm(2|\vec{a}|^2/\omega_{pulse}^2)^{0.5}\hat{a}. \qquad (39)$$

where $\omega_{pulse}^2$ is the bandwidth of the optical signal and can be determined by measuring the pulse shape of the optical signal with a spectrum analyzer. The CPU can be programmed with an optical signal bandwidth that was measured prior to operation because changes in PMD generally do not affect bandwidth. Alternatively the compensating apparatus can include a spectrum analyzer which monitors the bandwidth of the optical signal and sends electronic signals proportional to that bandwidth to the CPU.

Figure 10:
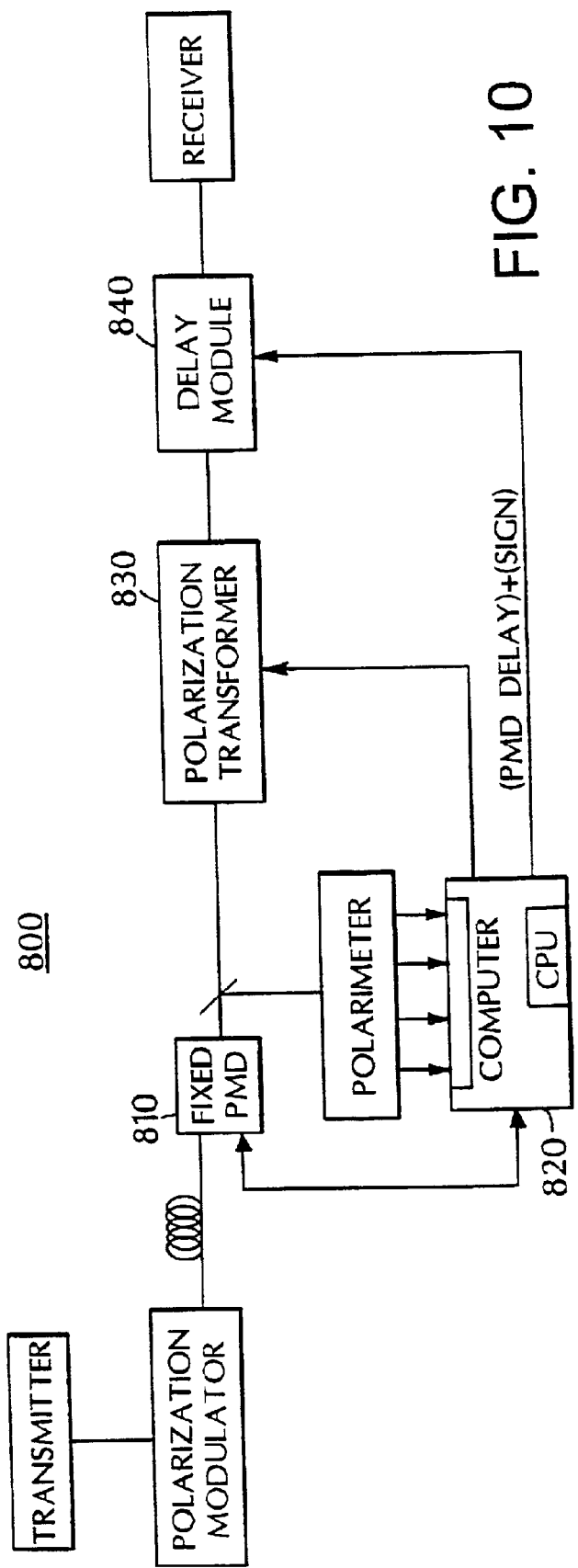
FIG. 10 is a block diagram of another PMD compensating apparatus.

When calculating an estimated PMD vector with equation 39, the CPU is unable to determine the correct sign because the mathematical methods cannot be used to extract the direction, either $+\hat{a}$ or $-\hat{a}$, from the DOP data. As discussed above with respect to FIG. 9, compensating apparatus 700 determines the correct sign by measuring the $DOP_{SIGN}$ after the delay module. In other embodiments, referring to FIG. 10, the CPU of a compensating apparatus 800 determines the sign without monitoring a $DOP_{SIGN}$ value. Compensating apparatus 800 includes a fixed PMD module 810, such as a birefringent crystal or delay module shown in FIG. 3, which adds a fixed, known PMD time delay, $\Omega_{KNOWN}$, to the variable, unknown PMD time delay, $\Omega_{UNKNOWN}$, produced within the optical fiber. By adding the fixed, known delay to the optical signal, CPU can identify the leading and trailing PSP by determining the correct sign in equation 39. CPU can determine the correct sign provided that $\Omega_{KNOWN}$ is greater than $\Omega_{UNKNOWN}$. For example, given a relationship such as $z=(100+x)^2$, unambiguous values of x can be calculated for any measured value of z provided that x is less than 100. The exact value of $\Omega_{KNOWN}$ depends upon the magnitude of $\Omega_{UNKNOWN}$ and can be estimated by a system operator prior to operation or can be determined by the CPU. For example, the CPU can multiply a previously calculated PMD time delay, $\Omega_{CALC}$, by a scaling factor to produce a value of the fixed, known time delay that satisfies the relationship $\Omega_{KNOWN} > \Omega_{CALC}$. The CPU, in turn, sends an electronic signal to fixed PMD module 810 to adjust the fixed delay to produce the necessary delay.

Figure 11:
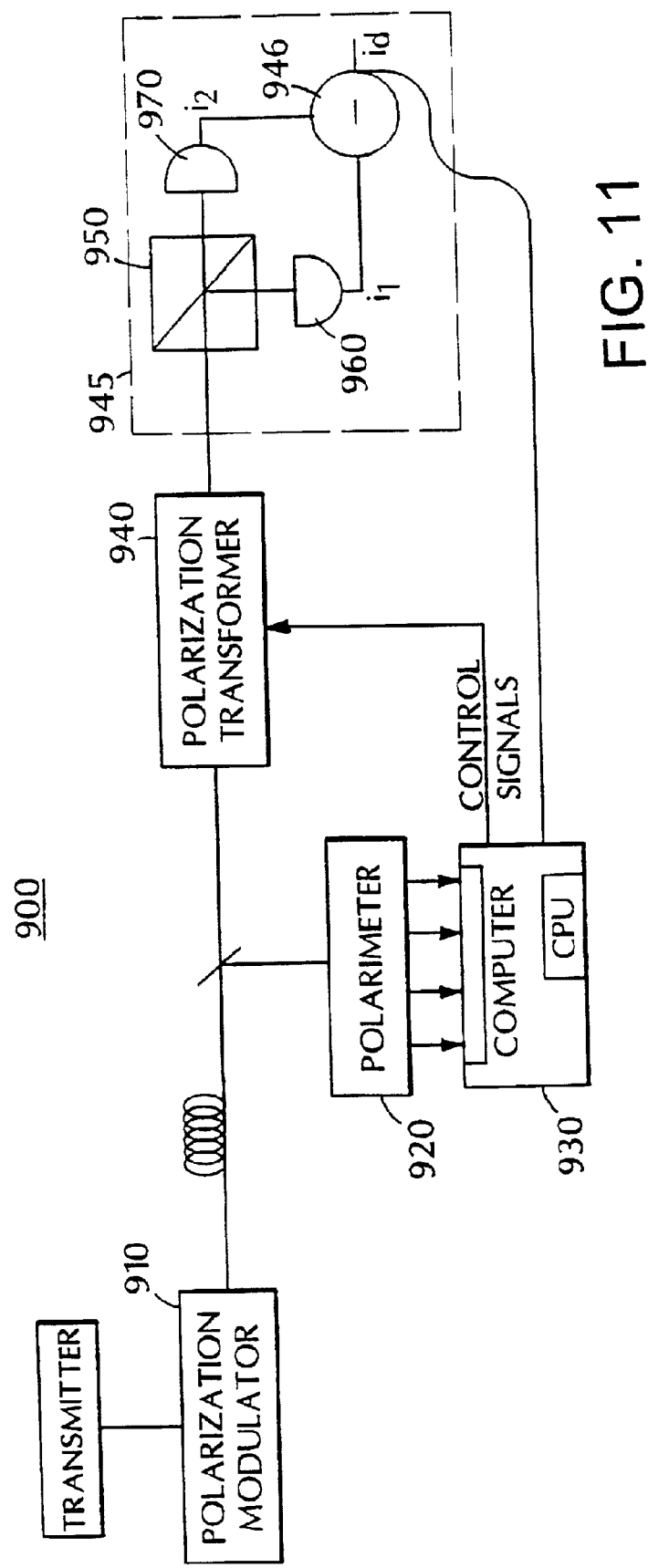
FIG. 11 is a block diagram of a apparatus for calibrating a polarization transformer.
Figure 12:
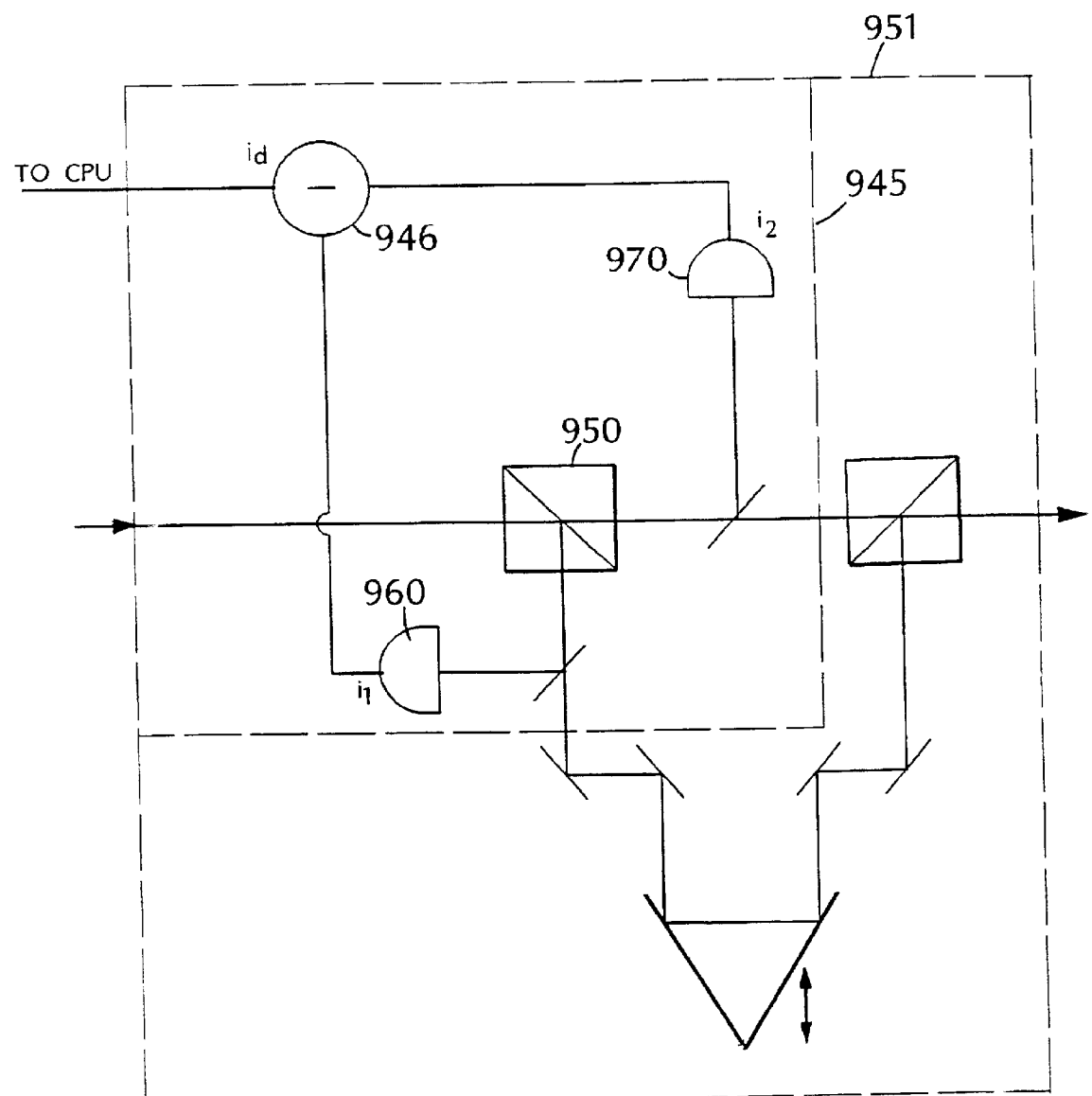
FIG. 12 is block diagram of an expanded view of a delay module integrated with a calibration unit.

Referring to FIG. 11, a system 900 for calibrating a polarization transformer 940 includes a transmitter 905, a polarization modulator 910, a polarimeter 920, a CPU 930, and a calibrating module 945. As described above, during operation, CPU 930 sends control signals to polarization transformer 940 to transform an optical signal such that a delay module (not shown) reduces PMD by retarding the leading PSP. The objective of system 900 is to determine, for a given set of electric control signals, what polarization state input into polarization transformer 940 will be transformed to different polarization states defined by the calibrating module. Calibrating module 945 includes a polarizing beam splitter (PBS) 950 having an orientation $\hat{p}$, and two photodetectors 960 and 970. As a transformed SOP, $\hat{s}$, from polarization transformer 940 propagates into calibrating module 945, PBS 950 redirects different portions of $\hat{s}$ onto detectors 960 and 970 based on the polarization of $\hat{s}$. Each detector produces separate currents that are proportional to different portions of the transformed SOP. The currents are given by the expressions $$i_1 = \tfrac{1}{2}(1+\hat{s}\cdot\hat{p}) \qquad (40)$$

and $$i_2 = \tfrac{1}{2}(1-\hat{s}\cdot\hat{p}) \qquad (41)$$

where $i_1$ and $i_2$ are normalized such that $(i_1+i_2)=1$. An analog device 946 receives $i_1$ and $i_2$ and sends an electric signal proportional to the difference of the two currents, $i_d$, to CPU 930. $i_d$ is the projection $\hat{s}\cdot\hat{p}$. Alternatively, CPU 930 can receive $i_1$ and $i_2$ and calculate the difference $i_d$. As polarization modulator 910 changes the SOP of the optical signal transmitted by transmitter 905, CPU 930 determines the SOP of the optical signal by analyzing the electric signals from polarimeter 920, and records $i_d$, and the magnitude of the control signals being sent to polarization transformer 940 for that SOP. By collecting a set of SOP measurements, $\hat{s}_j$, and storing them into a matrix S. CPU can construct an overdetermined matrix given by $$S\hat{p} = \vec{i}_d \qquad (42)$$

where each $\hat{s}_j$ is a 3-dimensional row of S, $\hat{p}$ is a 3-dimensional vector, and $\vec{i}_d$ is the vector of difference currents. CPU can estimate $\hat{p}$ by computing the pseudo-inverse of S. To calibrate polarization transformer 940, CPU computes an estimated p for a plurality of electric control signals and SOPs. CPU stores each estimated $\hat{p}$, SOP, and the values of the electric control signals in a lookup table. The lookup table provides specific electric control signals that will align the SOP with the axis system of the PBS. When compensating PMD, the calibrating module is replaced with the delay module such that the relative orientation between the module and PBS is known. After determining the location of the PSPs, the magnitude of the time delay, and which PSP is leading, the CPU uses the lookup table and the known relative orientation between the module and the PBS to determine which electric control signals are needed to transform the PSPs such that the delay module retards the leading PSP. In other embodiments, referring to FIG. 12, a calibrating module 945 and a delay module, such as described above with respect to FIG. 3, can be integrated into a single unit 951 so that the CPU can create a lookup table specifically for the polarization transformer and the delay module being used in a compensating apparatus.

In other embodiments, the polarization transformer can include polarization transforming devices, e.g., electrooptic, acoustooptic, or stress induce bifringence, which can transform the PSPs to linearly polarized PSPs aligned with the x- and y-axes of the delay controller. The delay module also can include any optical device capable of delaying of one polarization state relative to another polarization state. Although shown above as separate units, the polarization transformer and delay module can be integrated into a single unit that functions to transform the optical signal and delay the leading PSP to reduce PMD in the optical signal. An integrated polarization transformer and delay module is described, for example, by C. Glingeneret. al. in Optical Fiber Communications Conference PD29, 1999. A measure of performance of the PMD compensating apparatuses can be determined by monitoring the jitter in the rising edge of the PMD compensated optical signal. A histogram of the rising edge includes a variance that is proportional to residual PMD.

It should be understood that the foregoing description is intended to illustrate and not limit the scope of the invention, which is defined by the following claims. Other aspects, advantages, and modifications are within the scope of the following claims.

What is claimed is:
1. An optical compensating apparatus comprising:
   a polarization controller configured to receive an optical signal propagating through an optical medium, determine the principal states of polarization of the optical medium, determine a magnitude of time delay between the principle states of polarization, and transform the optical properties of the optical signal based on the principal states of polarization, wherein the polarization controller comprises a central processing unit programmed to monitor the time averaged state of polarization of the optical signal and determine the principle states of polarization of the optical medium and the magnitude of time delay between the principle states of polarization based on the time averaged state of polarization.

2. The apparatus of claim 1, wherein the polarization controller includes a polarimeter configured to receive and to measure the state of polarization of the optical signal, and a polarization transformer arranged in the path of the optical signal after the polarimeter and configured to transform the polarization of the optical signal.

3. The apparatus of claim 1, wherein the central processing unit analyzes time averaged states of polarization via the relationship, $$DOP = |\vec{r}_k| = \frac{1 - |\vec{a}|^2}{|\vec{r}_k - (\vec{a} \cdot \hat{\tau}_k)\vec{a}|},$$

to determine the principle states of polarization by calculating the vector $\vec{a}$.

4. The apparatus of claim 1, wherein the central processing unit is further programmed to determine the relative order, in time, of the principle states of polarization.

5. The apparatus of claim 1 further comprising a delay controller arranged in an optical path of the optical signal after the polarization controller, the delay controller configured to receive the transformed optical signal and to generate a signal proportional to the PMD time delay between the principle states of polarization.

6. The apparatus of claim 5, wherein the delay controller includes a polarimeter.

7. The apparatus of claim 6, wherein the delay controller includes a delay transformer arranged in the path of the transformed optical signal before the polarimeter.

8. The apparatus of claim 1 further comprising a PMD generating module arranged in the optical path of the medium before the polarization controller and configured to receive the optical signal from the optical medium and generate a known PMD.

9. The apparatus of claim 1 further comprising a calibrating unit arranged in an optical path of the optical signal after the polarization controller, the calibrating unit configured to receive the transformed optical signal and determine the transformation of the polarization controller.

10. The apparatus of claim 9, wherein the calibrating unit includes at least one detector for detecting one or more components of the optical signal.

11. An optical compensating apparatus for reducing PMD in an optical signal transmitted through an optical medium, the apparatus comprising:

a polarization controller configured to receive an optical signal propagating through the optical medium, determine the principal states of polarization of the optical medium and a magnitude of time delay between the principal states of polarization; and a delay controller arranged in an optical path of the medium after the polarization controller and configured to receive a transformed optical signal, wherein the polarization controller transforms the optical signal based on the principal states of polarization and the delay controller compensates PMD of the optical signal by reducing the time delay between the principle states of polarization based on the magnitude of time delay.

12. The apparatus of claim 11, wherein the polarization controller includes a polarimeter.

13. The apparatus of claim 12, wherein the polarization controller includes a polarization transformer arranged in the path of the optical signal after the polarimeter.

14. The apparatus of claim 11, wherein the delay controller is further configured to generate a signal proportional to the PMD time delay between the principle states of polarization.

15. The apparatus of claim 11, wherein the delay controller includes a polarimeter.

16. The apparatus of claim 15, wherein the delay controller includes a delay transformer arranged in the path of the transformed optical signal before the polarimeter.

17. The apparatus of claim 16, wherein the delay controller includes a delay transformer arranged in the path of the transformed optical signal after the polarimeter of the polarization controller and before a polarimeter of the delay controller.

18. An optical compensating apparatus for reducing PMD in an optical signal transmitted through an optical medium, the apparatus comprising:

a polarization module configured to receive an optical signal propagating through the optical medium, determine the principal states of polarization of the optical medium, determine a magnitude of time delay between the principle states of polarization, and generate a signal for transforming the polarization of the optical signal; and an optical transformer arranged in an optical path of the medium after the polarization module and configured to transform the optical signal and reduce a time delay between the principle states of polarization based on the signal received from the polarization module.

19. The apparatus of claim 18, wherein the polarization module comprises a polarimeter.

20. The apparatus of claim 18, wherein the optical transformer comprises a polarization transformer and a delay controller, the polarization transformer and a delay controller each comprising a polarimeter, and the polarimeter of the delay controller configured to generate a signal proportional to the PMD time delay.

21. The apparatus of claim 20, wherein the delay controller comprises a delay transformer arranged in the path of the transformed optical signal before the polarimeter of the delay controller and after the polarization transformer.

22. A method of reducing PMD of an optical signal propagating in an optical medium, the method comprising:

determining the principal state of polarizations of the optical medium with a polarization controller, determine a magnitude of time delay between a first principle states of polarization and a second principal state of polarization with the polarization controller, and transforming the polarization of the optical signal with a polarization transforming device based on the polarization of the principal states of polarization.

23. The method of claim 22 further comprising delaying the first principal state of polarization with respect to a second principal state of polarization.

24. The method of claim 22 further comprising determining the relative order, in time, of the principle states of polarization.

25. The method of claim 22 further comprising monitoring a time averaged state of polarization of an optical signal propagating through the optical medium.

26. The method of claim 25, wherein determining the principle states of polarization comprises analyzing the time averaged state of polarization.

27. The method of claim 26, wherein the time averaged states of polarization follow the relationship, $$DOP = |\vec{r}_k| = \frac{1 - |\vec{a}|^2}{|\vec{r}_k - (\vec{a} \cdot \hat{\tau}_k)\vec{a}|},$$

and determining the principle states of polarization includes calculating the vector $\vec{a}$.

28. The method of claim 27, wherein the vector $\vec{a}$ is determined by analyzing $\vec{r}_k$ with nonlinear curve fitting techniques or matrix methods.

29. The method of claim 22 comprising calibrating a polarization controller for transforming the optical signal to determine a plurality of control settings for the polarization controller by monitoring which control signals when applied to the polarization control transform an input optical signal having a specific state of polarization into an output signal having different state of polarization.

30. A method of compensating PMD of an optical signal propagating through an optical medium, the method comprising:

recording the time averaged state of polarization of an optical signal propagating through an optical medium;

and analyzing the time averaged state of polarization of the optical signal via a pertubative expansion of the time averaged state of polarization, $\vec{r}$, to extract a plurality of parameters from the time averaged state of polarization that characterize the PMD of the optical signal, wherein the pertubative expansion is expressed as $$DOP^2 \equiv |\vec{r}|^2 =$$
$$|\vec{S}_{0,\parallel}|^2$$
$$+(1\Delta\omega^2_{pulse}$$
$$\tau^2_{PMD})|\vec{S}_{0,\perp}|^2+O\{\Delta\omega^3\}.$$

* * * * *